Nov. 29, 1949     E. VAN DER PYL     2,489,602
APPARATUS FOR HANDLING AND PROCESSING
MOLTEN REFRACTORY MATERIALS

Filed Aug. 11, 1944     2 Sheets-Sheet 1

Inventor
EDWARD VAN DER PYL
By William T. Kuesner
Attorney

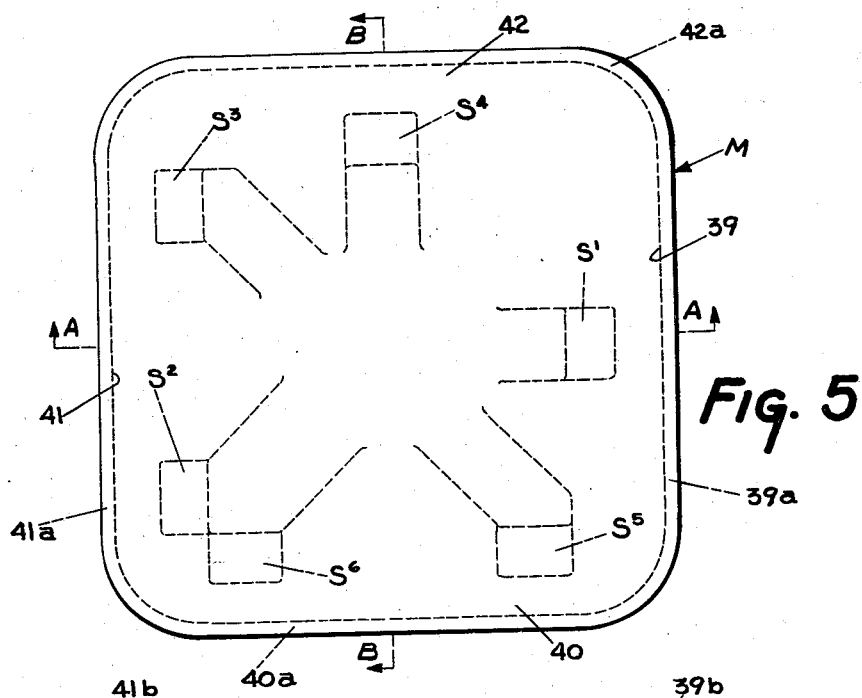
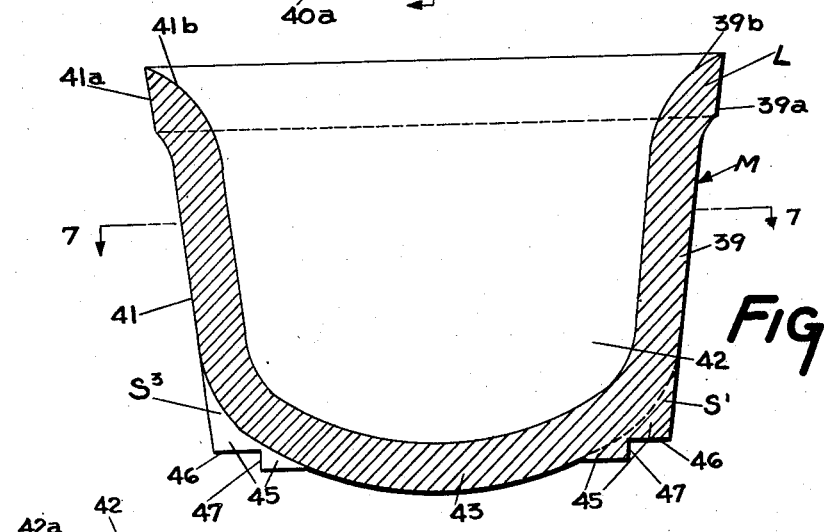
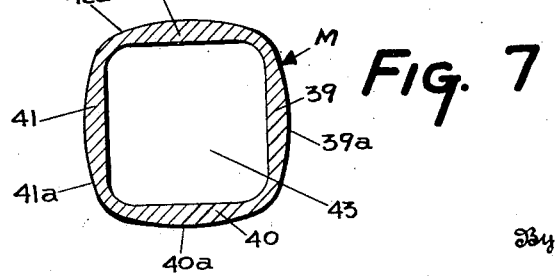

Patented Nov. 29, 1949

2,489,602

UNITED STATES PATENT OFFICE 2,489,602

APPARATUS FOR HANDLING AND PROCESSING MOLTEN REFRACTORY MATERIALS

Edward Van der Pyl, Holden, Mass., assignor to Norton Company, Worcester, Mass., a corporation of Massachusetts Application August 11, 1944, Serial No. 549,009

7 Claims. (Cl. 49—39)

This invention relates to apparatus for handling material which is initially in a molten phase and which solidifies upon cooling to a solid phase. The apparatus disclosed herein is particularly adapted for handling material such for example as fused or molten refractory materials of which fused alumina is a good illustration, having a temperature on the order of 2000° C. when poured from the melting furnace. With such materials it is desirable to charge the molten material into a suitable number of molds or containers and to provide for the cooling-off of the charges and of the molds to form ingots of the material in solid phase, one ingot for each mold; it is desirable that a succession of such molds be successively charged, as from the melt in the furnace, and preferably suitable carriers are provided for supporting the desired number of molds and progressing them in succession past or relative to the pour stream of the furnace to thereby successively fill the molds with molten material.

One of the objects of this invention is to provide a simple and practical mold or container structure for receiving heated material in molten phase constructed to cooperate with carrier means in such a way that its own life and that of the carrier means may be prolonged, under the conditions of extreme temperatures met with. Another object is to provide a mold and mold carrier capable of such interrelation that the mold may be given any one of a plurality of positions relative to the carrier and relative to other molds on the carrier, and if desired, relative to molds on other carriers, all while achieving dependability of assemblage of the mold or molds to the carrier.

Another object is to provide a mold construction that will be simple, practical and inexpensive and that will be capable of achieving, in the aggregate and in the course of repeated use, substantial uniformity of temperature or heat effects upon the molds employed even though, during any individual cycle of use of the mold or molds, non-uniformity of heat or temperature effects exists or occurs. Another object is to provide a mold and mold carrier construction in which the relationship of the mold to the carrier or of the mold to other molds on the carrier may be changed in a simple and practical way without disturbing stability of support of the mold or molds by the carrier means and hence without giving rise to danger of spillage as might be caused if the mold or molds could partake of wobble relative to each other or to the carrier upon change in their relationships. Another object is to carry out this last-mentioned object in a manner that will nevertheless facilitate ease of placement of a mold or of molds on the carrier or of removal thereof therefrom, while at the same time guarding against misalignment of molds relative to one another and against lateral shift of a mold or molds relative to the carrier.

Other objects will be in part obvious or in part pointed out hereinafter.

The invention accordingly consists in the features of construction, combinations of elements, and arrangements of parts, all as will be pointed out in the following description, and the scope of the application of which will be indicated in the following claims.

In the accompanying drawings, in which is shown an illustrative embodiment of the mechanical features of this invention, Figure 1 is a side elevation of a carrier and mold assembly, showing how a succession of such assemblages may be interrelated;

Figure 5 is a plan view on an enlarged scale of a mold disassembled from its carrier and showing certain features of construction whereby it coacts with the carrier and also with the dumper mechanism;

Figure 6 is a central vertical sectional view of the mold as seen along the line A—A of Figure 5, and Figure 7 is a horizontal sectional view on a smaller scale as seen along the line 7—7 of Figure 6.

Similar reference characters refer to similar parts throughout the several views of the drawings.

Figure 1:
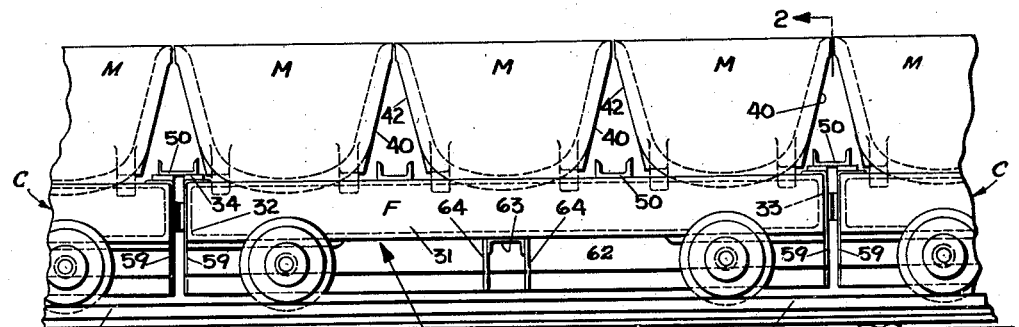
Figure 2:
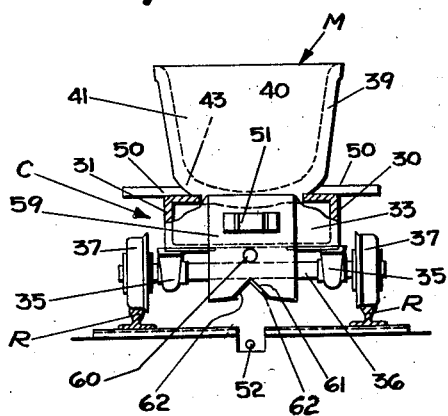
Figure 2 is an end view of a carrier and mold assemblage as seen along the line 2—2 of Figure 1, certain parts being broken away to show certain relationships more clearly.

Referring first to Figures 1 and 2 I have there shown carriers each generally indicated by the reference character C and one or more, illustratively three, container or mold elements, for each carrier C and each mold element being generally indicated by the reference character M; in Figure 1 several carriers are shown in end to end relation so that the mold or molds carried thereby can form a succession of as many molds as may be desired according to the number of carriers that it is desired to arrange in end to end relation. The molds M and carriers C are interengaged with each other to permit speed and facility of assemblage or disassemblage for rearrangement of their relationships as may be dictated from cycle to cycle of operation, each cycle comprising the charging of the succession of molds with the molten material, followed by heat loss or transfer from the molds and their charges so that the latter solidify into ingots, and followed in turn by a dumping operation to discharge the ingots from the molds.

These inter-relationships of the elements of the assembly and the manner in which each coacts with the other will be better understood by now considering first the carrier C and then the relationship thereto of the molds M.

Accordingly, the carrier car C preferably comprises a rectangular frame F preferably made of flanged structural steel elements, illustratively channel-sectioned, bent to form the frame F or welded together to make up the frame F, thus to provide two longitudinally extending side frame members 30 and 31 and two end frame members 32 and 33; plate-like gussets or braces 34 (Figure 3) may be welded, one at each corner of the frame thus to strengthen it and these may rest upon and be welded to the upper flange elements of the channel-sectioned frame parts.

To the lower flange elements of the side frame members 30 and 31 are secured as by bolting or welding brackets 35, one pair adjacent each end of the frame through which extend axles 36 preferably rigidly secured therein and on the projecting ends of the axles 36 are rotatably carried flanged wheels 37 each of which is provided with any suitable bearing construction, such as an anti-friction bearing, for rotatably supporting it by and on the axles. The wheel mounting of this type is preferred rather than to provide bearings in the brackets 35, because there is lesser chance of heat flow to the bearings within the wheels 37 on the axles than there is from the carrier frame to the brackets 35. Where trackage rails are employed, the wheels 37 are of course appropriately spaced to coact with the rails R.

The length and width of the frame F and the dimensions and construction of the molds M are interrelated and to make this relationship clearer a preferred and illustrative mold construction may first be described. As appears better from Figures 5, 6, and 7 the mold M is preferably substantially square in horizontal cross-section so as to provide four side walls 39, 40, 41, and 42, but preferably well rounded off at a substantial radius of curvature at the junctions of the side walls so as to avoid sharp interior corner angles and these side walls, which are preferably inclined downwardly and inwardly along their inner surfaces so as to give an outwardly flaring interior, merge in curvatures of preferably large radius into the bottom wall 43 which in its upper face is preferably concave.

Where it is desired to achieve certain rates of cooling of the hot charge of the mold M and to achieve other thermal actions, the thicknesses of the side and bottom walls of the mold M may be substantially uniform as is indicated in Figure 6 and accordingly the outer faces of the side walls also incline downwardly and inwardly and at their upper ends the inner and outer surfaces of the side walls merge to form a peripheral lip L which externally projects, preferably by way of a downwardly and inwardly inclined peripheral surface $39^a$, $40^a$, $41^a$, and $42^a$, beyond the downwardly and inwardly inclined external faces of the side walls 39, 40, 41, and 42 respectively. With this construction, molds may be arranged in end to end relation as shown in Figure 1, but adjacent side walls of adjacent molds M are prevented from being brought into close proximity to each other by the outwardly projecting lip L whose downwardly and inwardly inclined outer peripheral faces $39^a$, $40^a$, $41^a$, and $42^a$, as the case may be, can function even to prevent surface-to-surface engagement between adjacent molds and to insure that any contact between adjacent molds is no more than a line of contact. Such a line of contact can act to diminish material spillage of molten material down in between adjacent molds as a succession of molds is progressed relative to a pour stream of molten material, while on the other hand the curvature of the inner faces of the side walls as is indicated at $39^b$ and $41^b$ for example in Figure 5 can function effectively, when two lips of adjacent molds are brought together as above described, to deflect the molten material of the pour stream into the molds, during such progression.

Illustratively the molds may be made of cast iron of a wall thickness on the order of two inches, they may have an overall height on the order of eighteen inches and an overall width of twenty-four inches; they are thus massive and of substantial weight; where the carrier C is to receive three molds, the length of the frame F (Figures 1 and 3) is three times the width of the mold and illustratively therefore is seventy-two inches long. In width, the frame F is commensurate with the maximum width of the molds as appears better from Figure 2. The side frame members 30 and 31 (Figures 2 and 3) are, however, spaced apart in a certain relationship to certain structural features embodied in the molds, preferably in the bottom thereof.

Bearing in mind that the molds are heavy, that the discharge of molten material which each receives adds to that weight and in the case of fused alumina may add about five hundred pounds, and that the molten material may be of very high temperature, it is desirable to insure that each mold M seats on the carrier C in a state of stability and without giving rise to risk of wobble or tilt relative to the carrier. Also it should be noted that it is desirable that the molds M on the carrier C be occasionally or from time to time turned through 90° (about their vertical axes) so as to avoid having always the same side walls thereof adjacent to each other and thus to avoid having the adjacent side walls subjected to more severe thermal conditions than those side walls of the molds that are exposed at the sides of the carrier C. Accordingly, each mold is provided with what will hereinafter be termed feet so disposed and in such number that each mold will always rest on the frame F of the carrier by way of three feet no matter which of its side walls is placed adjacent a succeeding mold; with three points of support for any condition of assembly of a mold to the carrier C, the mold is always resting on the carrier C in stable equilibrium, will not tilt or wobble and spillage of molten material with attendant danger is thus guarded against.

In the drawings, a preferred embodiment of the just mentioned arrangement of feet for the mold is indicated. Formed preferably integrally with and on the external face of the bottom wall 43 are two sets of feet or supports, one set comprising the feet $S^1$, $S^2$, and $S^3$, and the other set comprising the feet $S^4$, $S^5$, and $S^6$. Each foot comprises in effect a sufficiently heavy lug 45 cast integrally with the mold M and formed with a right angled notch or cut-out, which may be machined if desired, each cut-out presenting a horizontal face 46 of substantial area and a vertical face 47 of a depth or vertical dimension somewhat in excess of the thickness of the inwardly directed flanges of the side frame members 30, 31 of the carrier frame F.

The horizontal faces 46 of all of the feet preferably fall in the same horizontal plane. The set of feet $S^1$, $S^2$, and $S^3$ are disposed substantially at the apexes of a triangle, illustratively an isosceles triangle, with the vertical faces 47 of feet $S^2$ and $S^3$ being in line with the base of the triangle (viewing Figure 5 from the left) and the vertical face 47 of foot $S^1$ passing through the apex of the triangle; the altitude of this triangle is equal to the spacing between the adjacent edges of the side frame members 30 and 31 (Figures 2 and 3) and hence the mold may be positioned on these side frame members with the two horizontal faces 46 of feet $S^2$ and $S^3$ resting on frame member 30 the inner edge of which is engaged by the vertical faces 47 of the feet $S^2$ and $S^3$ to thereby properly align the mold M relative to the longitudinal frame F, for these faces 47 are parallel or aligned with the opposed parallel side walls 41 and 39 of the mold M; the face 46 of the foot $S^1$ at the apex of the triangle rests upon the other side frame member 31 and its vertical face 47 extends downwardly along the inner edge of the frame member 31. The two legs $S^2$ and $S^3$ (Figure 5) will be seen to be preferably closely adjacent to corners of the mold M at the ends of the side wall 41 while the foot $S^1$ is substantially intermediate of the corners at the ends of the opposite side wall 39. Such disposition insures against material displacement of a mold rotationally about its vertical axis relative to the carrier frame and each mold is thus neatly aligned with the carrier frame and hence also with other molds on the carrier.

Moreover, the three supporting faces 46 of the three legs form the sole contacting portions with the carrier frame, giving dependable and rigid support to the mold even though there might be warpage of the frame such as might be caused by irregularities in the trackage over which it is run.

The other set of feet $S^4$, $S^5$, and $S^6$ are similarly disposed in an isosceles triangle but the base of the latter is at 90° to the base of the triangle in which the set of feet $S^1$, $S^2$, and $S^3$ are disposed. Thus, in Figure 5, the horizontal faces 46 of the legs $S^5$ and $S^6$ and their aligned vertical faces 47 may be rested upon and interfitted with one of the side frame members, being at the base of the triangle, while the corresponding faces of the apex foot $S^4$ become interfitted with the opposite side frame member. Figure 6 is a sectional view along the line B—B of Figure 5 as much as along the line A—A thereof.

When the first set of feet $S^1$, $S^2$, and $S^3$ are caused to function, the side walls 39 and 41 of the mold are exposed laterally of the carrier C and give freely lost heat to the atmosphere after being charged with molten material, but the other side walls 40 and 42 of the mold become positioned adjacent side walls of an adjacent mold and though newly adjacent walls slope away from each other (see Figure 1) so as to provide a substantial air space therebetween for heat loss, the heat lost therefrom is at a far lesser rate than in the case of the laterally exposed side walls and hence they become subjected to more severe thermal conditions which as a result could bring about shortening of the life of the mold. But after a mold has functioned a suitable number of times in a cycle in one position on the carrier C, it is lifted off of the carrier, as by a crane or the like, turned through 90° about its vertical axis, and reset on the carrier C. The thermal operating conditions of the respective opposed side walls of the mold are now reversed from what they were before, and after going through a suitable number of cycles, reversal may again be effected. In this manner, the life of each mold M is greatly extended and greatly dissimilar thermal operating conditions are caused to have substantially uniform effects, in the aggregate, upon the mold structures.

These features are of peculiar advantage where a succession of many molds is made to function in the cycle of operations, as for example where any suitable number of carriers C are coupled together, as indicated in Figure 1, to provide a continuous succession of molds M for progressive movement along the trackage; for such purposes, the overall length of the molds M carried by one carrier C and the overall length of the carriers C are made the same so that when carriers C are coupled together the molds at the adjacent ends of the carriers are brought into proper coacting relationship, that is, with their lips L brought into the same relationship as have the molds M on any one carrier C.

Such a succession of carriers and molds may therefore be progressed along the tracks R, preferably step by step, relative to a continuous pour stream of molten material, which need not be interrupted, and thus fill one mold after another, with minimum spillage of molten material at the lip-junctions between adjacent molds.

Nevertheless some spillage or splashing may take place as a lip-junction is traversed through the continuous pour stream and hence provision is made to protect the carriers and related parts against damage by spilled molten material.

Figure 3:
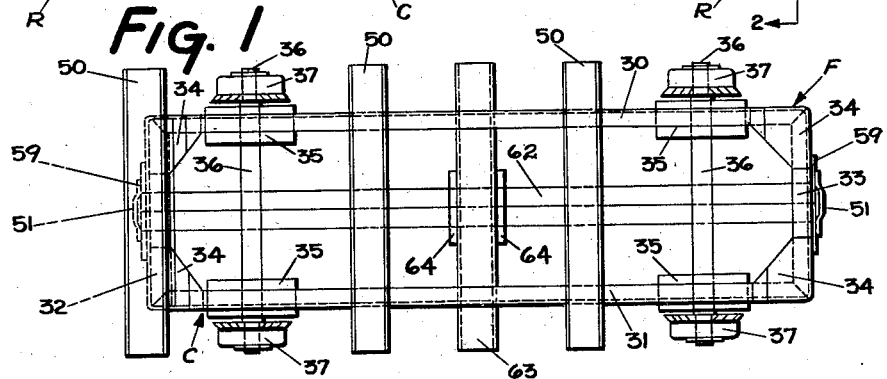
Figure 3 is a plan view of a carrier with the molds disassembled therefrom.

Thus, as shown in Figures 1 and 3, there are provided transversely extending shield or trough members 50, three for each carrier where the carrier is to take three molds and each conviently made up of suitably heavy channel-sectioned structural steel members. They rest upon and are secured as by welding to the longitudinal side frame members 30 and 31, projecting laterally beyond them sufficiently to protect also the trackage R. Two of them lie at the bottoms of the spaces between the adjacent walls of the three molds on one carrier C, underlying the lip-junctions therebetween, while the third one (at the left hand end of the carrier C in Figure 3) rests upon the frame F with half of its width overlying or projecting beyond the left hand end of the frame F to which it may be secured as by welding to the reinforcing plates 34; it is thus positioned to overlie the right hand end of the next succeeding carirer C (see Figure 1) and thus to catch any spillage between the adjacent lips of the two adjacent molds M which are at the adjacent ends of the succeeding carriers. It also, however, overlies the junction between two succeeding carrier frames and is thus in position to close over the gap therebetween and protect underlying parts, including coupling or bumper devices or the like.

The coupling devices may be of any suitable form and in the drawings (Figures 1, 2, and 3) are shown in the form of heavy U-shaped plates 51 welded to a suitable part of the frame F, thus forming an eye at each end of the carrier C to receive any appropriate form of coupling device such as a heavy U-shaped pin, the two arms of which are received in the respective eyes of adjacent ends of the carriers. The parts 51 may be made suitably heavy to function also as bumpers, if desired.

Figure 4:
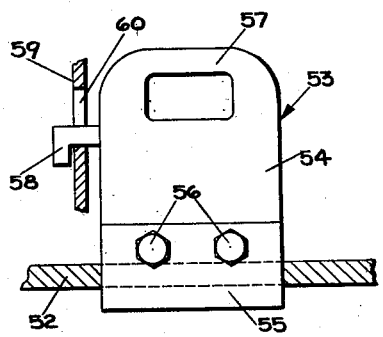
Figure 4 is a side elevation, on a larger scale, showing a form of connecting element for detachably connecting a cable to a carrier, certain parts being shown in section, broken away, or omitted.

In a preferred form of arrangement for progessing or moving a carrier or a succession of carriers along the trackage, a cable 52 may be employed accommodated midway between the two tracks R in any suitable longitudinally extending slot or pit along which the cable 52 may be hauled or pulled by any suitable mechanism such as a winch or the like and any suitable means being provided whereby a carrier C, preferably an end carrier of the series, may be coupled preferably detachably to the cable and in Figure 4 an illustrative form of such a coupling device is shown and indicated by the reference character 53.

The device 53 of Figure 4 may comprise a suitably heavy plate 54 suitably formed at its lower end to form one element or a jaw of a clamping device of which the other element or jaw is a companion but smaller plate 55, suitable screws or bolts 56 being provided to clamp the two plates against the two sides of the cable 52 which is received between them, the plates being provided with suitable concaved seats (not shown) for the portion of the cable that they are to grip. With such an arrangement connecting device 53 may be readily attached or detached from the cable and may be clamped to it at any point in its length, a feature of advantage where the cable haul is of the so-called endless type.

The upper end of the plate 54 is suitably shaped to provide a handle 57 so that the coupling device and a short reach of the cable may be manually raised out of the space between the tracks R to cause a hook 58, formed in or secured to one of the vertical edges of the plate 54, to be brought into or out of connecting relation with the companion connecting element on the carrier C which is to be coupled to the cable 52, and such a companion connecting element may comprise simply a plate 59 depending in a vertical plane from a carrier and provided with a hole 60 in the center line of the carrier through which the hook shaft element 58 may be engaged or disengaged, as appears clearly from Figure 4. With such a connection to the cable, the carrier may be pulled or pushed according to the direction in which the cable 52 is moved.

Preferably each end of the carrier frame F of each carrier C is provided with such a coupling plate 59, as appears better from Figure 1 and as is better shown in Figure 2, coupling plate 59 may comprise simply a rectangular plate abutting against the end frame member (32 or 33) to which it is securely welded, thus also reinforcing the end frame member, and it is preferably onto the coupling plate 59 that the U-shaped coupling and bumper member 51 is mounted and secured as by welding.

As is better shown in Figures 1 and 2, the cable-coupling plate members 59 at the two ends of each carrier are preferably of substantial downward dimension, extending below the axles 36, and their lower central portion is cut-out in the form of an inverted V as at 61 (Figure 2) to form seats for the reception thereinto of an inverted V-shaped cable projecting shield 62 which is preferably a structural steel angle-sectioned element, being secured in position by welding it at its respective ends to end plates 59.

Because the shield member 62 may be of substantial length and in order that it may also better function as a strengthening element for the frame F, there is preferably provided suitable means for bracing it to the frame F at a point or points intermediate of its length and this may be accomplished by securing as by welding an inverted channel member 63 crosswise of the under flanges of the side frame members 30 and 31 (see Figures 1 and 3), and securing to each flange of the cross member 63 a depending plate or brace 64 each of which is preferably also given an inverted V-shaped recess to receive the shield member 62 which is secured to each as by welding.

Accordingly, whatever spillage takes place due to progressing the succession of molds M carried by one or more carriers C past a continuously running pour stream is dependably caught by the transverse projecting trough members 50 and by them diverted to either side of the trackage R. Coupling and bumper elements are always protected by the endmost members 50 of the carriers C which also protect the cable and cable pit from spillage through the space between adjacent ends of carriers. Any spilling or splashing that might otherwise be directed toward the cable or cable pit is dependably deflected and protected by the shield 62 that extends lengthwise of each carrier and in close proximity to the cable pit so as substantially to form a protecting closure or cover therefor that moves along with the cable.

With the molds M filled, the carrier or carriers may be transferred to trackage to permit heat loss from the molds and their contents and thus to achieve solidification of the cast material. The contents of the molds may be discharged in any suitable way, as by upsetting the assemblage of molds and carrier, the somewhat shrunken ingot easily emerging from the mold, whence the molds and carriers may be returned to the charging station along the trackage R again to be charged with molten material, and the cycle of operations repeated. At the conclusion of any cycle, that is, after dumping, the molds may be, as above described, lifted off of the carrier or carriers as by a crane, and each turned through 90° about its vertical axis, and reset on the carrier C; by the latter turn, the thermal operating conditions of the respective opposed side walls of the mold are now reverse from what they were before, and by periodically effecting such reversals, substantially uniform heat or temperature effects, in the aggregate, are brought to bear upon each mold so that its life becomes greatly extended. Of course, it will now be appreciated, the molds may be given such 90° turns at any appropriate point in the cooling-off or heat-loss portion of the cycle, so as to substantially equalize otherwise dissimilar heat effects upon opposed mold walls during the cooling-off stage in each cycle, but because that would necessitate handling and hoisting of not only greater loads, since each mold contains its charge at that time, but also at still high temperatures, it is preferred to turn the molds after dumping and when they are at lower temperature.

It will thus be seen that there has been provided by this invention apparatus in which the various objects hereinabove set forth together with many thoroughly practical advantages are successfully achieved. As various possible embodiments might be made of the mechanical features of the above invention, all without departing from the scope of the invention, it is to be understood that all matter hereinbefore set forth or shown in the accompanying drawings is to be interpreted as illustrative and not in a limiting sense.

I claim:

1. A carrier and mold assembly for handling molten refractory material comprising a carrier car, spaced parallel members having horizontal portions forming part of said carrier car, a plurality of similar square molds mounted on said car, each mold having a peripheral lip at its top on all sides of the square whereby any two molds may be placed together leaving no space between them, the molds having sides which flare outwardly in an upward direction so that with the lips of two molds in engagement the sides of the molds below the lips are spaced apart, each mold having six lugs for engagement with the spaced parallel members to prevent the molds from moving transversely of the carrier car while allowing the molds to move lengthwise of the carrier car, said lugs being arranged on the molds in a one one two two arrangement on the sides of the square whereby each mold is supported at three points on the spaced parallel members by two lugs on one side and one lug on the other side and any mold may be lifted and turned 90° and will still be supported at three points by two lugs on one side and one lug on the other side.

2. A carrier and mold assembly for handling molten refractory material comprising a carrier car, spaced parallel members having horizontal portions forming part of said carrier car, a plurality of similar square molds mounted on said car, each mold having a peripheral lip at its top on all sides of the square whereby any two molds may be placed together leaving no space between them, the molds having sides which flare outwardly in an upward direction so that with the lips of two molds in engagement the sides of the molds below the lips are spaced apart, each mold having means for engagement with the spaced parallel members so arranged as to prevent the molds from moving transversely of the carrier car while allowing the molds to move lengthwise of the carrier car and so arranged as to permit any mold to be lifted and turned 90° and reset on the spaced parallel members to be in like manner held thereby.

3. In apparatus as claimed in claim 2, the combination with the parts and features therein specified, of wheels on said carrier car, a rail track for said carrier car supporting said wheels, a cable between the rails of said track to move said carrier car, means carried by said carrier car and overlying said cable throughout the length of the carrier car and forming a continuous shield-like means to protect the cable from molten refractory material.

4. In apparatus as claimed in claim 2, the combination with the parts and features therein specified, of trough shield members secured to the carrier car over the spaced parallel members and extending transversely to the spaced parallel members and located under the junctions of the lips to divert molten refractory material.

5. A carrier car and mold assembly comprising a pair of parallel longitudinal frame members, a pair of axles rigidly secured to the under side of said frame members perpendicular to them and extending beyond them on each side, wheels rotatable on the axles outside of said frame members, a plurality of square molds on said frame members, means for seating each mold on said frame members in any of four positions of orientation 90° apart whereby said molds can be adjusted longitudinally of the frame members but are fixed laterally thereof, two of the sides of each mold being parallel to the frame members when the molds are seated thereon and the other two sides of each mold being therefore perpendicular to said frame members at said time each mold having a peripheral lip at its top on all sides of the square whereby any two molds may be placed together leaving no space between them, each mold having sides which flare outwardly in an upward direction so that with the lips of two molds in engagement the sides of the molds below the lips are spaced apart.

6. In apparatus as claimed in claim 5, the combination with the parts and features therein specified, of a rail track for the carrier car, a cable between the rails of the track to move said carrier car, and means carried by said carrier car and overlying said cable throughout the length of the carrier car and forming a continuous shield-like means to protect the cable from molten refractory material.

7. In apparatus as claimed in claim 5, the combination with the parts and features therein specified, of trough shield members secured to the carrier car over the parallel longitudinal frame members and extending transversely to the parallel longitudinal frame members and located under the junctions of the lips to divert molten refractory material.

EDWARD VAN DER PYL.

REFERENCES CITED

The following references are of record in the file of this patent:

UNITED STATES PATENTS

| Number | Name | Date |
| --- | --- | --- |
| 140,927 | Kloman | July 15, 1873 |
| 260,388 | Hainsworth | July 4, 1882 |
| 347,784 | Endres | Aug. 24, 1886 |
| 478,792 | Gayner | July 12, 1892 |
| 495,843 | Shipp | Apr. 18, 1893 |
| 601,083 | Potter | Mar. 22, 1898 |
| 620,020 | Davies | Feb. 21, 1899 |
| 683,885 | Vaughen | Oct. 1, 1901 |
| 1,003,477 | Lloyd | Sept. 19, 1911 |
| 1,420,018 | Bray | June 20, 1922 |
| 1,798,485 | Mulvihill | Mar. 31, 1931 |
| 1,889,951 | Cox | Dec. 6, 1932 |

FOREIGN PATENTS

| Number | Country | Date |
| --- | --- | --- |
| 392,364 | Great Britain | May 18, 1933 |